(12) United States Patent
Chou et al.

(10) Patent No.: US 12,047,005 B2
(45) Date of Patent: Jul. 23, 2024

(54) POWER CONTROLLER AND CONTROL METHOD WITH FUNCTIONS OF SOFT BURST-IN AND SOFT BURST-OUT

(71) Applicant: Leadtrend Technology Corporation, Zhubei (TW)

(72) Inventors: Kuan-Hsien Chou, Zhubei (TW); Yao-Tsung Chen, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 223 days.

(21) Appl. No.: 17/818,794

(22) Filed: Aug. 10, 2022

(65) Prior Publication Data

US 2023/0170781 A1    Jun. 1, 2023

(30) Foreign Application Priority Data

Nov. 26, 2021 (TW) ................. 110144130

(51) Int. Cl.
*H02M 3/335* (2006.01)
*H02M 1/00* (2006.01)

(52) U.S. Cl.
CPC ..... *H02M 3/33507* (2013.01); *H02M 1/0009* (2021.05); *H02M 1/0035* (2021.05); *H02M 3/33561* (2013.01); *H02M 3/33571* (2021.05)

(58) Field of Classification Search
CPC ............ H02M 1/0035; H02M 1/0009; H02M 3/33507; H02M 1/0025; H02M 3/01; H02M 3/33571; H02M 3/33561; Y02B 70/10
See application file for complete search history.

(56) References Cited

U.S. PATENT DOCUMENTS

| | | | | |
|---|---|---|---|---|
| 5,438,253 A | * | 8/1995 | Aritsuka | H02J 3/1842 363/39 |
| 2005/0212501 A1 | * | 9/2005 | Acatrinei | H02M 1/4208 323/283 |
| 2008/0094048 A1 | * | 4/2008 | Basso | H02M 1/36 323/283 |
| 2010/0014331 A1 | * | 1/2010 | Moon | H02M 3/33507 363/89 |
| 2010/0238689 A1 | * | 9/2010 | Fei | H02M 3/33523 363/21.16 |
| 2013/0229829 A1 | * | 9/2013 | Zhang | H02M 3/01 363/16 |
| 2014/0009977 A1 | * | 1/2014 | Huang | H02M 3/33507 363/21.16 |

(Continued)

*Primary Examiner* — Yusef A Ahmed
(74) *Attorney, Agent, or Firm* — McClure, Qualey & Rodack, LLP

(57) ABSTRACT

A control method is provided for operating a power converter with a power switch and an inductive device. A current-sense signal is provided to represent an inductor current through the inductive device. An ON time of the power switch is determined in response to a feedback signal and a saw-wave signal, to operate the power converter in a non-power-saving mode. The feedback signal is generated according to an output voltage of the power converter. The power converter can be operated in a power-saving mode, a burst mode. Operating in the burst mode, the ON time is determined in response to the current-sense signal and a current-limiting signal, which is increased during a soft burst-in time and is decreased during a soft burst-out time.

18 Claims, 6 Drawing Sheets

(56) References Cited

U.S. PATENT DOCUMENTS

| | | | | |
|---|---|---|---|---|
| 2014/0146581 | A1* | 5/2014 | Tsou | H02M 1/32 |
| | | | | 327/175 |
| 2015/0003117 | A1* | 1/2015 | Ferrazza | H02M 3/335 |
| | | | | 363/21.04 |
| 2015/0055383 | A1* | 2/2015 | Xu | H02M 3/33507 |
| | | | | 363/21.18 |
| 2016/0099639 | A1* | 4/2016 | Leisten | H02M 3/3376 |
| | | | | 323/271 |
| 2016/0352231 | A1* | 12/2016 | Quigley | H02M 1/36 |
| 2017/0110973 | A1* | 4/2017 | Chen | H03L 7/00 |
| 2017/0214325 | A1* | 7/2017 | Chang | H02M 1/08 |
| 2018/0062527 | A1* | 3/2018 | Lu | H02M 3/18 |
| 2019/0348910 | A1* | 11/2019 | Chou | H02M 1/44 |
| 2020/0036290 | A1* | 1/2020 | Yang | H02M 3/24 |
| 2020/0106368 | A1* | 4/2020 | Chen | H02M 3/33523 |
| 2020/0195154 | A1* | 6/2020 | Mayell | H02M 1/083 |
| 2020/0358360 | A1* | 11/2020 | Sonobe | H02M 3/28 |
| 2021/0111620 | A1* | 4/2021 | Jin | H02M 3/01 |
| 2021/0135563 | A1* | 5/2021 | Wei | H02M 7/53876 |
| 2021/0305888 | A1* | 9/2021 | Chen | H02M 1/08 |
| 2021/0313794 | A1* | 10/2021 | Huang | H02H 1/0007 |
| 2023/0147857 | A1* | 5/2023 | Chen | H02M 1/32 |
| | | | | 363/15 |
| 2023/0344356 | A1* | 10/2023 | Lu | H02M 1/0064 |

* cited by examiner

US 12,047,005 B2

POWER CONTROLLER AND CONTROL METHOD WITH FUNCTIONS OF SOFT BURST-IN AND SOFT BURST-OUT

CROSS-REFERENCE TO RELATED APPLICATION

This application claims priority to and the benefit of Taiwan Application Series Number 110144130 filed on Nov. 26, 2021, which is incorporated by reference in its entirety.

BACKGROUND

The present disclosure relates generally to a switching mode power converter, and more particularly, to a switching mode power converter capable of operating with functions of soft burst-in and burst-out.

Power conversion efficiency is of essence for power converters. Not only the power conversion efficiency of a power converter must be excellent when the power converter drives a heavy load, but also the power converter is required to consume power as little as possible when there is no load, so the power converter will not consume much power when standby.

LLC resonant power converters are renowned in view of the excellency in power conversion efficiency, especially for the conditions of high-power applications. An LLC resonant power converter commonly has two main power switches operating at ZVS (zero voltage switching) to minimize conduction loss of the two main power switches, so its power conversion efficiency is considerably outstanding when driving a normal or heavy load.

The power conversion efficiency of an LLC resonant converter deteriorates significantly when the load is light or absent. Switching frequency of the two main power switches increases as the load becomes lighter, so the switching loss of the two main power switches, the power required to turn ON and OFF the two main power switches, increases, making power conversion efficiency considerably lower.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
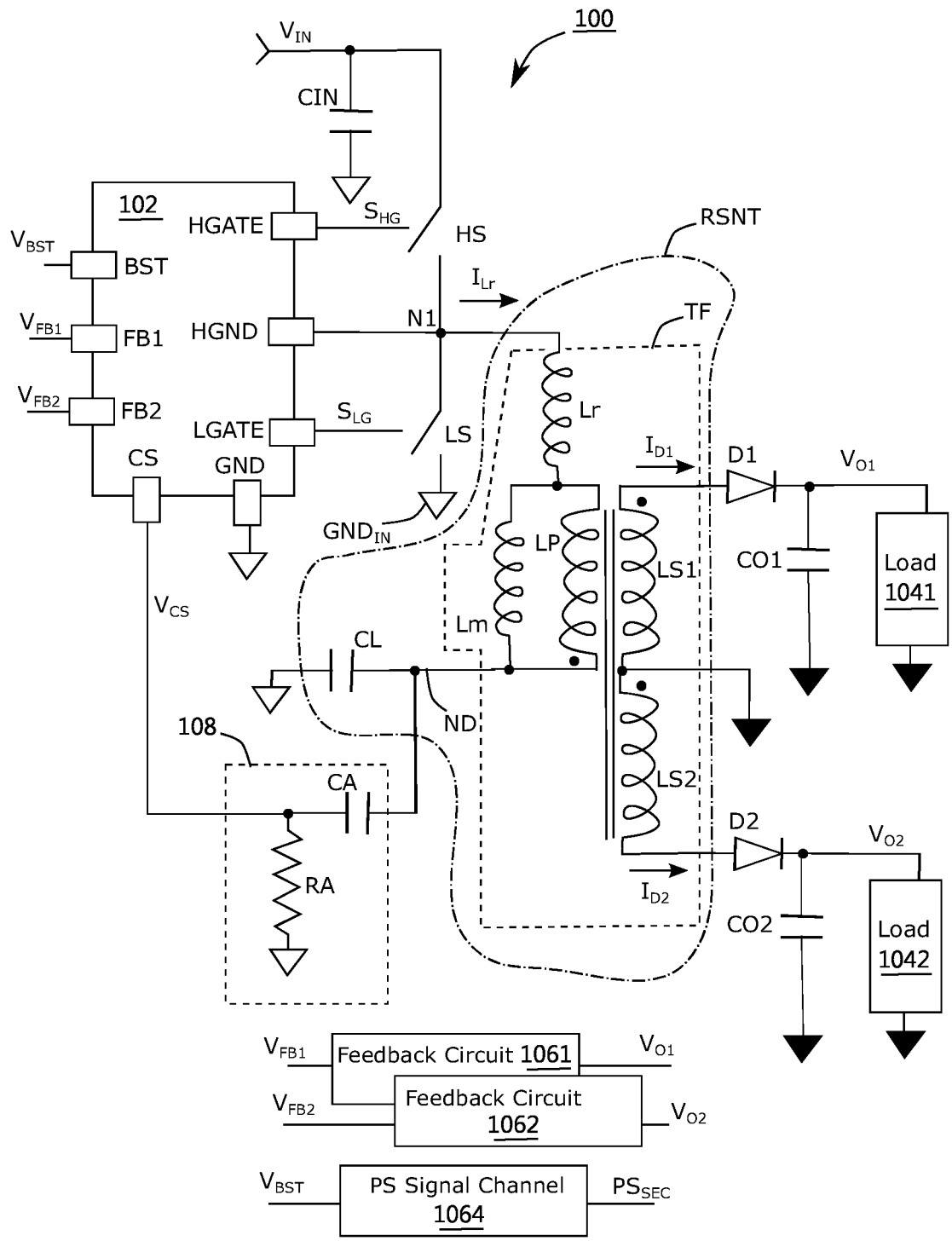
FIG. 1 demonstrates an LLC resonant power converter according to embodiments of the invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

An LLC resonant power converter according to embodiments of the invention is detailed in this specification, but the invention is not limited to however. The invention may be applicable to other kinds of resonant power converters, or different PWM (pulse-width-modulation) power converters.

According to embodiments of the invention, an LLC resonant power converter has a power controller controlling a high-side switch and a low-side switch, both connected to a resonant circuit including a transformer and a capacitor. The transformer is an inductive device. The power controller controls one of the high-side switch and the low-side switch in response to a feedback signal, which is generated in response to an output voltage of the LLC resonant power converter. The power controller also receives a current-sense signal representing an inductor current through the transformer.

When the LLC resonant power converter drives a heavy load, the LLC resonant power converter operates in a non-power-saving mode, a voltage-control mode where the power controller determines an ON time of the first power switch in response to the feedback signal and a saw-wave signal.

When the LLC resonant power converter drives a light load or no load, the power controller performs burst-mode operation, or makes the LLC resonant power converter operate in a power-saving mode. In the power-saving mode, the power controller continuously switches ON and OFF the first power switch for a burst time and constantly keeps the power switch OFF for a pause time. The burst time includes a soft burst-in time in the beginning and a soft burst-out in the end. During the soft burst-in and burst-out times, the LLC resonant power converter operates in a current-control mode, where the power controller determines an ON time of the first power switch in response to a current-limiting signal and the current-sense signal. During the soft burst-in time, the current-limiting signal increases overtime. In the opposite, during the soft burst-out time, the current-limiting signal decreases overtime.

In an embodiment of the invention, the summation of the burst time and the pause time is a predetermined period, a reciprocal of a predetermined hiccup frequency $f_{BST}$. The function of soft burst-in/burst-out means that the LLC resonant power converter softly enters/exits the burst-mode operation during the soft burst-in/burst-out time. Soft burst-in and soft burst-out can prevent audible noise that happens otherwise due to the sudden activation or deactivation of power conversion.

FIG. 1 demonstrates LLC resonant power converter 100 according to embodiments of the invention, converting input voltage $V_{IN}$ into output voltages $V_{o1}$ and $V_{o2}$ to supply power to loads 1041 and 1042 respectively.

High-side switch HS and low-side switch LS, forming a half bridge topology, are connected in series between input voltage $V_{IN}$ and input ground $GND_{IN}$, to make resonant circuit RSNT resonate. Resonant circuit RSNT has transformer TF and capacitor CL. Transformer TF includes primary winding LP and two secondary windings LS1 and LS2, inductively coupled to one another. Inductors Lr and Lm represent two leakage inductance devices of transformer TF, where inductor Lr connects in series with primary winding LP and inductor Lm connects in parallel to primary winding LP. Joint node ND connects primary winding LP to capacitor CL. This invention is not limited to resonant circuit RSNT in FIG. 1, and some embodiments of the invention might have a resonant circuit different from resonant circuit RSNT. Each of high-side switch HS and low-side switch LS is capable of controlling inductor current $I_{Lr}$ that goes through inductor Lr.

When resonant circuit RSNT resonates, secondary windings LS1 and LS2 may generate induced currents $I_{D1}$ and $I_{D2}$, which can build up output voltages $V_{o1}$ and $V_{o2}$ after the rectification provided by diodes D1 and D2.

Feedback circuits 1061 and 1062 monitor output voltages $V_{o1}$ and $V_{o2}$ respectively, to provide feedback signals $V_{FB1}$ and $V_{FB2}$. In response to feedback signals $V_{FB1}$ and $V_{FB2}$, LLC controller 102 provides high-side gate signal $S_{HG}$ and low-side gate signal $S_{LG}$ to control high-side switch HS and low-side switch LS, determining ON time $TON_{HG}$ of high-side switch HS and ON time $TON_{LG}$ of low-side switch HS. An ON time of a switch means a time period when the switch is turned ON to provide a short circuit between two terminals of the switch.

LLC resonant power converter 100 has detection circuit 108 including resistor RA and capacitor CA, connection of which is shown in FIG. 1. Through joint node ND, detection circuit 108 detects voltage across capacitor CL in resonant circuit RSNT, to provide to LLC controller 102 current-sense signal $V_{CS}$, capable of representing inductor current $I_{Lr}$. Current-sense signal $V_{CS}$ in FIG. 1 is only an example of a detection signal. Some embodiments of the invention may have a different detection circuit that provides a signal different to current-sense signal $V_{CS}$.

In FIG. 1, circuitry in the secondary side may provide power saving signal $PS_{SEC}$ based on a system request, and, through signal channel 1064, power saving signal $PS_{SEC}$ causes in the primary side the change of burst signal $V_{BST}$, which informs, via burst pin BST, LLC controller 102 to operate in a power-saving mode. For example, if circuitry in the secondary side requests LLC resonant power converter 100 to operate in the power-saving mode, via the help of signal channel 1064, the circuitry makes burst signal $V_{BST}$ more than 1V. To exit the power-saving mode and to operate LLC resonant power converter 100 in a non-power-saving mode, the circuitry makes burst signal $V_{BST}$ less than 1V.

For example, feedback circuits 1061 and 1062, and signal channel 1064 each has a photo coupler to transmit signals from the secondary side to the primary side while providing galvanic isolation therebetween.

Figure 2:
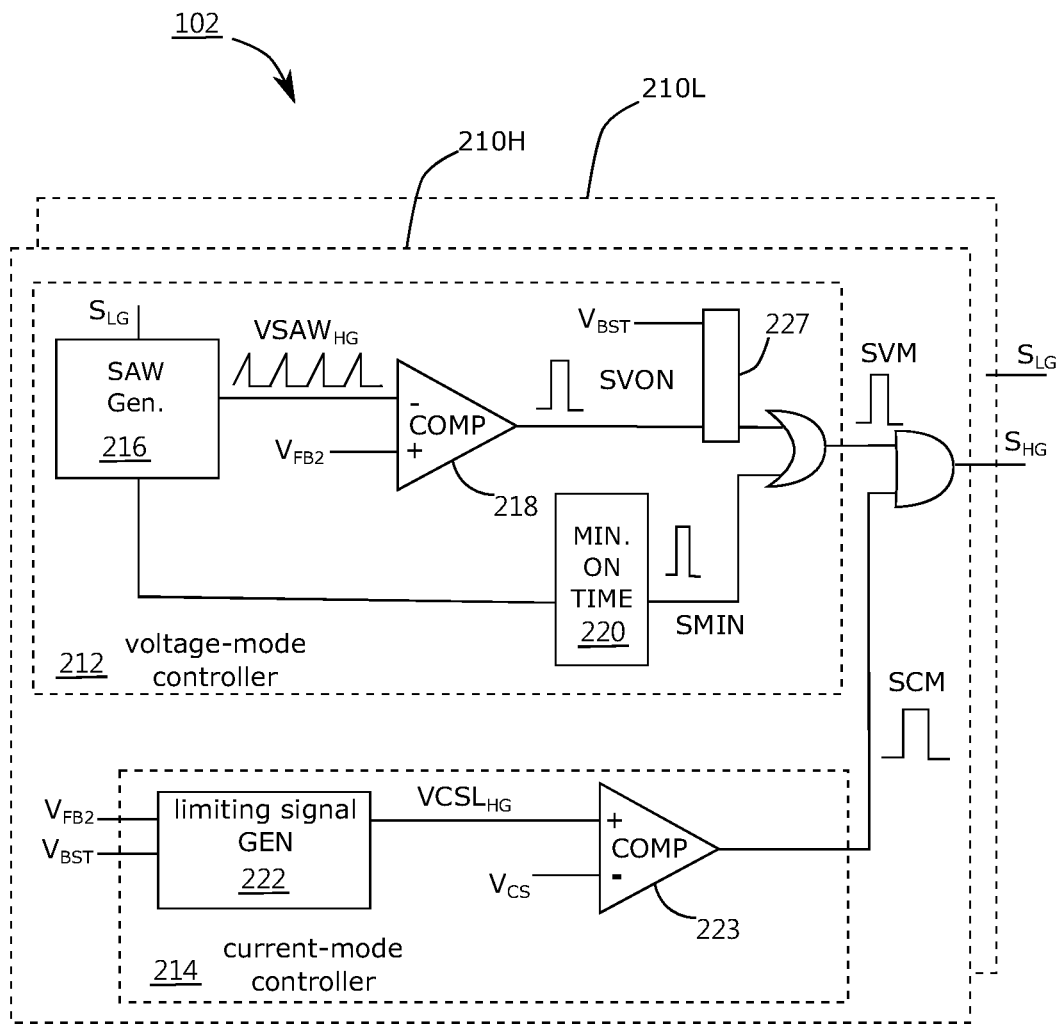
FIG. 2 demonstrates the LLC controller in FIG. 1.

FIG. 2 demonstrates LLC controller 102 in FIG. 1 according to embodiments of the invention, comprising high-side control circuit 210H and low-side control circuit 210L. In view of brevity, FIG. 2 only details high-side control circuit 210H and persons skilled in the art can derive low-side control circuit 210L based on the teaching of high-side control circuit 210H. In some embodiments of the invention, high-side control circuit 210H may share a portion of its own circuit with low-side control circuit 210L.

High-side control circuit 210H has voltage-mode controller 212 and current-mode controller 214. A deadtime after low-side gate signal $S_{LG}$ turns OFF low-side switch LS, voltage-mode controller 212 and current-mode controller 214 generate pulses SVM and SCM respectively, both starting at the same time to turn ON high-side switch HS. The pulse width of pulse SVM is voltage-mode ON time $TON_{VM}$, and that of pulse SCM is current-mode ON time $TON_{CM}$. It is derivable from FIG. 2 that ON time $TON_{HG}$ of high-side switch HS is whichever is less between voltage-mode ON time $TON_{VM}$ and current-mode ON time $TON_{CM}$.

Voltage-mode controller 212 has, but is not limited to have, saw-wave generator 216, comparator 218, minimum ON time generator 220, and blocker 227. Voltage-mode controller 212 generates pulse SVON based on saw-wave signal $VSAW_{HB}$ from saw-wave generator 216 and feedback signal $V_{FB2}$, determining ON time $TON_{HG}$ of high-side switch HS. Comparator 218 compares saw-wave signal $VSAW_{HG}$ with feedback signal $V_{FB2}$. Minimum ON time generator 220 provides minimum ON time pulse SMIN, whose pulse width defines minimum ON time $TON_{MIN}$. When burst signal $V_{BST}$ is determined that LLC resonant power converter 100 shall operate in the non-power-saving mode, blocker 227 lets pulse SVON pass by. Otherwise, blocker 227 blocks pulse SVON from going through and makes its own output "0" in logic always when burst signal $V_{BST}$ shows that LLC resonant power converter 100 shall operate in the power-saving mode. It will be detailed later that when operating in the non-power-saving mode, ON time $TON_{HG}$ is always not less than minimum ON time $TON_{MIN}$, and that when operating in the power-saving mode, ON time $TON_{HG}$ is always not more than minimum ON time $TON_{MIN}$.

Current-mode controller 214 has, but is not limited to have, limiting-signal generator 222 and comparator 223. In response to feedback signal $V_{FB2}$ and burst signal $V_{BST}$, limiting-signal generator 222 provides current-limiting signal $VCSL_{HG}$, which comparator 223 compares with current-sense signal $V_{CS}$ to generate pulse SCM.

Figure 3:
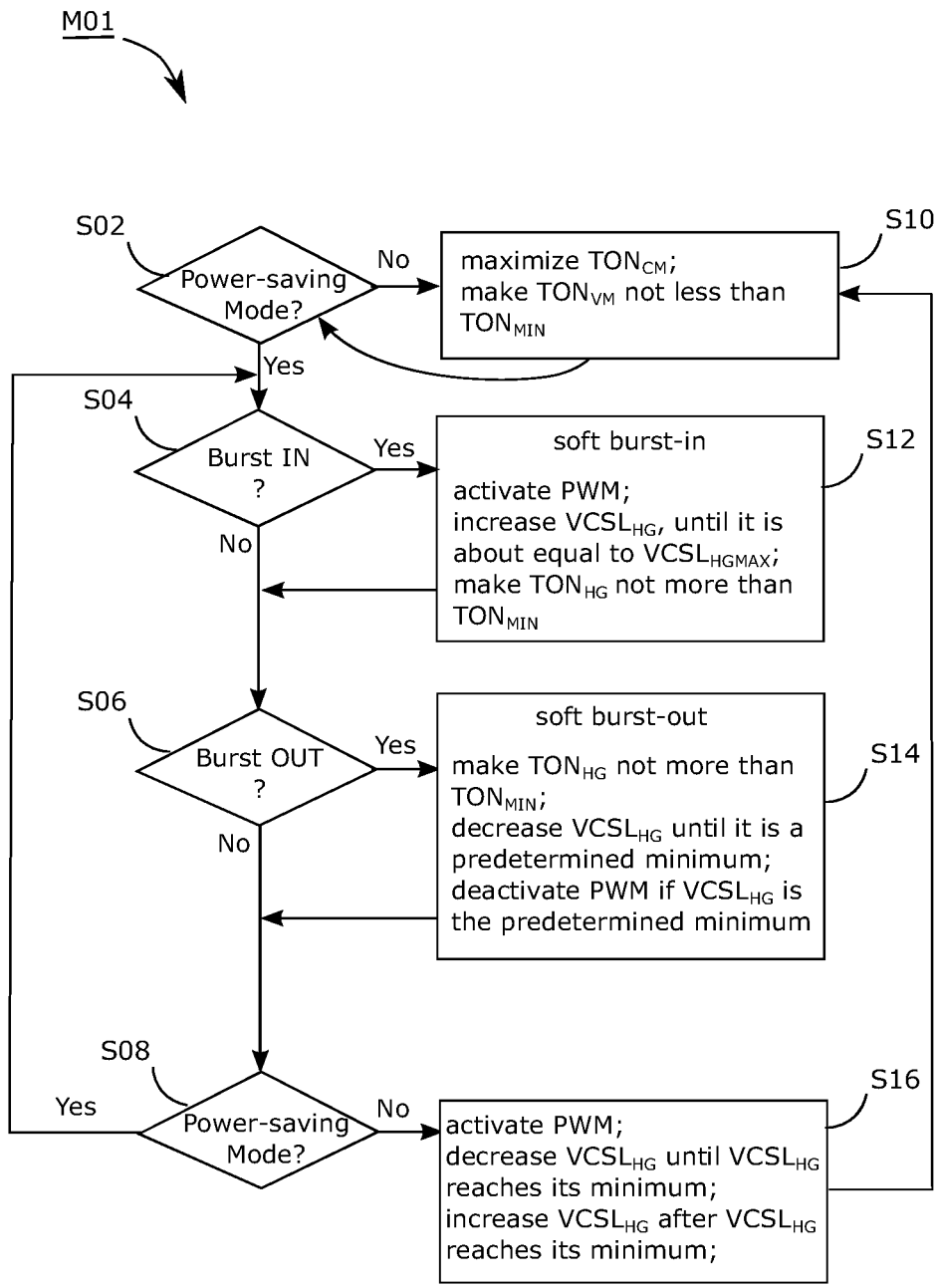
FIG. 3 shows a control method suitable in use of the LLC controller in FIG. 2.

FIG. 3 shows control method M01 suitable in use of LLC controller 102.

Please refer to FIGS. 2 and 3. Step S02 determines whether to operate in a power-saving mode or in a non-power-saving mode. For example, LLC controller 102 operates LLC resonant power converter 100 in a power-saving mode if burst signal $V_{BST}$ is found to be more than 1V, or if both feedback signals $V_{FB1}$ and $V_{FB2}$ are less than 1V. When burst signal $V_{BST}$ is found to be more than 1V, LLC controller 102 in FIG. 2 sets current-limiting signal $VCSL_{HG}$ as maximum signal $VCSL_{HGM}$, which defines the maximum of current-sense signal $V_{CS}$ under the operation of the power-saving mode. In an embodiment, maximum signal $VCSL_{HGMAX}$ varies if burst signal $V_{BST}$ changes. When it is determined to operate in the power-saving mode, the loop comprising steps S04, S06 and S08 continues until step S08 confirms that it is time to exit the power-saving mode. According to an embodiment of the invention, if burst signal $V_{BST}$ is found to be less than 1V, and any of feedback signals $V_{FB1}$ and $V_{FB2}$ is more than 1V, step S10 follows step S02 to operate LLC resonant power converter 100 in the non-power-saving mode.

Figure 4:
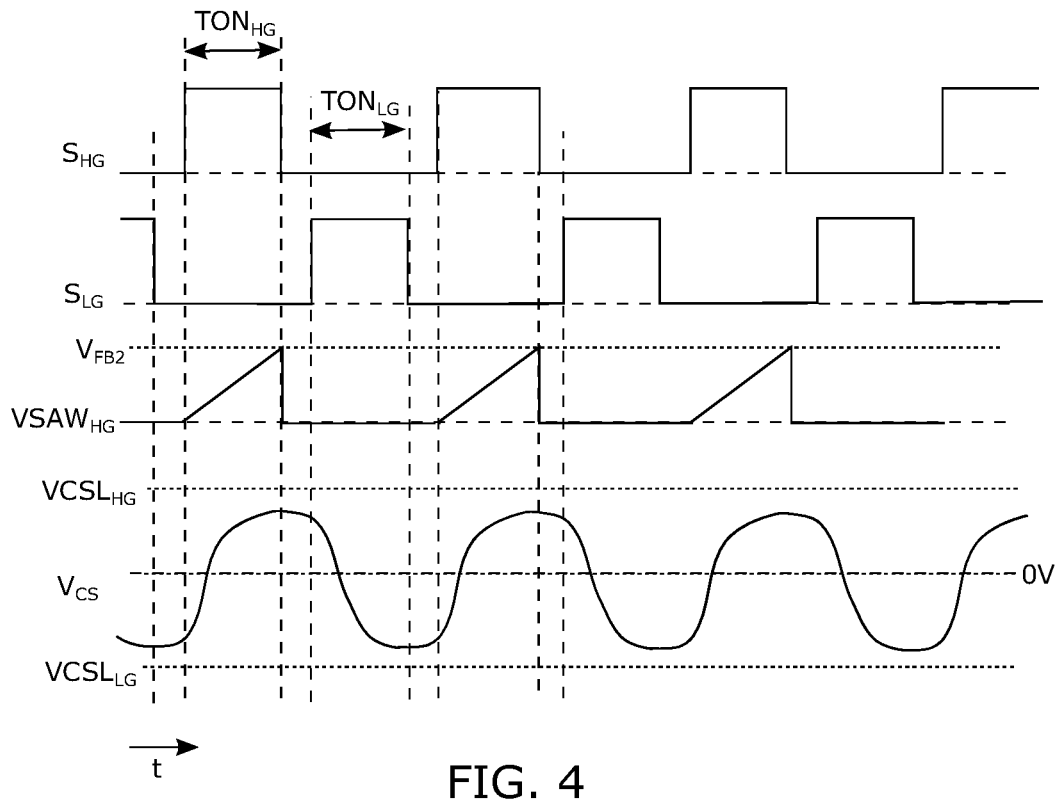
FIG. 4 shows signal waveforms when the LLC controller in FIG. 2 operates in the non-power-saving mode.

Step S10 maximizes current-mode ON time $TON_{CM}$ and makes voltage-mode ON time $TON_{VM}$ not less than minimum ON time $TON_{MIN}$. Please refer FIGS. 2 and 4, where FIG. 4 shows signal waveforms when LLC controller 102 operates in the non-power-saving mode. Under the non-power-saving mode, current-limiting signal $VCSL_{HG}$ is set to be very high for maximizing current-mode ON time $TON_{CM}$, so ON time $TON_{HG}$ of high-side switch HS is determined by pulse SVON provided from voltage-mode controller 212, and ON time $TON_{HG}$ is not less than minimum ON time $TON_{MIN}$. In other words, ON time $TON_{HG}$ basically is determined by the comparison between saw-wave signal $VSAW_{HG}$ and feedback signal $V_{FB2}$, as shown in FIG. 4, and this is called voltage-mode control in the art. Even though it is not shown in FIG. 4, ON time $TON_{LG}$ of low-side switch LS is also determined by the comparison between another saw-wave signal and feedback signal $V_{FB1}$. When feedback signal $V_{FB2}$ is fixed, ON time $TON_{HG}$ is fixed, independent from input voltage $V_{IN}$.

Figure 5:
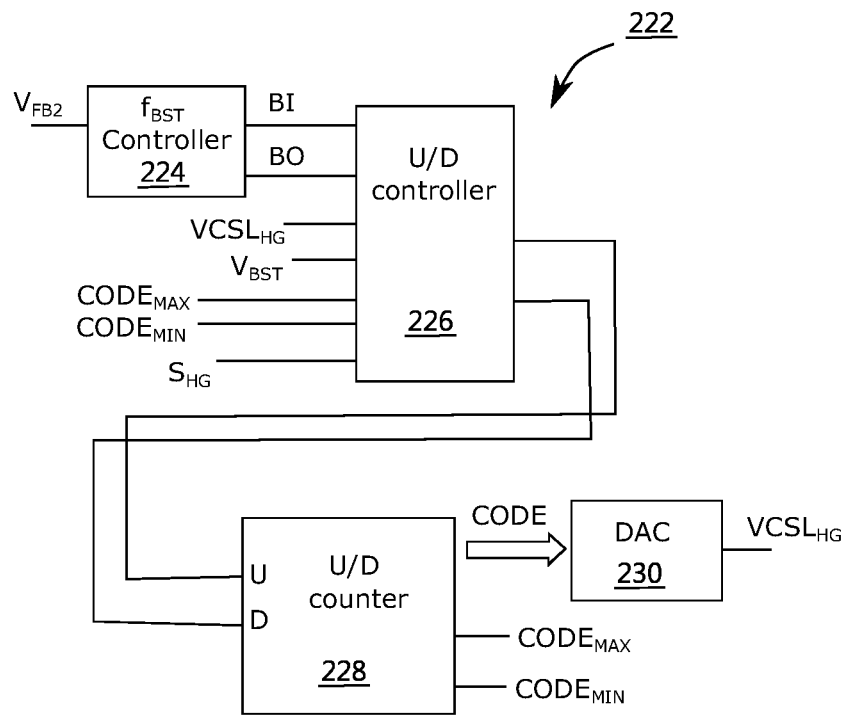
FIG. 5 shows the limiting-signal generator in FIG. 2.

FIG. 5 shows limiting-signal generator 222 in FIG. 2, with hiccup-frequency ($f_{BST}$) controller 224, up/down controller 226, up/down counter 228, and digital-to-analog converter (DAC) 230. In response to feedback signal $V_{FB2}$, $f_{BST}$ controller 224 provides burst-in pulse BI and burst-out pulse BO to up/down controller 226, which controls up/down counter 228 to count up, count down, or hold the count. Up/down counter 228 is configured to prevent from overflow. When count CODE reaches its maximum or minimum, up/down counter 228 stops counting and signals up/down controller 226 its own status by sending maximum signal $CODE_{MAX}$ or minimum signal $CODE_{MIN}$. DAC 230 converts count CODE into current-limiting signal $VCSL_{HG}$. According to one embodiment of the invention, another digital-to-analog converter generates current-limiting signal $VCSL_{LG}$ based on count CODE, to control current-sense signal $V_{CS}$ and $TON_{LG}$ of low-side switch LS.

Figure 6:
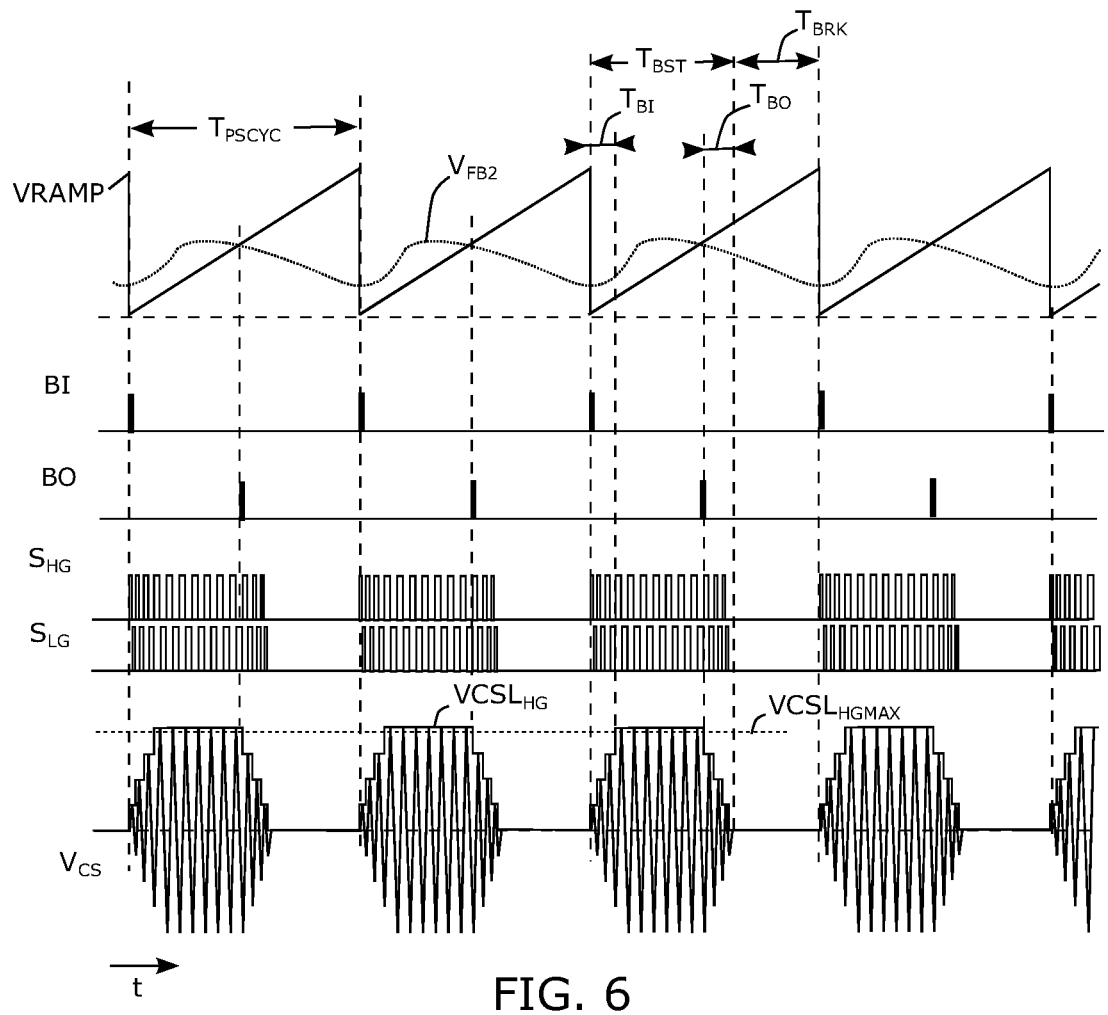
FIG. 6 demonstrates signal waveforms of the LLC controller in FIG. 2 when operating in the power-saving mode.

FIG. 6 demonstrates signal waveforms of LLC controller 102 when operating in the power-saving mode. As shown in FIG. 6, the power-saving mode is a burst mode, where high-side switch HS and low-side switch LS are continuously switched ON and OFF for burst time $T_{BST}$ and, after then, are constantly kept OFF for pause time $T_{BRK}$. Burst time $T_{BST}$ alternates with pause time $T_{BRK}$ in a burst mode, as shown in FIG. 6, and the summation of a burst time $T_{BST}$ and a pause time $T_{BRK}$ is about predetermined period $T_{PSCYC}$, the reciprocal of hiccup frequency $f_{BST}$ of triangular-wave signal VRAMP. For example, hiccup frequency $f_{BST}$ is about 800 Hz and predetermined period $T_{PSCYC}$ 1.25 ms. hiccup frequency $f_{BST}$ is preferably a constant, so transformer TF converts and provides operation power to LLC controller 102 for example every predetermined period $T_{PSCYC}$, to prevent LLC controller 102 from dying of power hunger.

As aforementioned, when operating in the power-saving mode, blocker 227 in FIG. 2 blocks pulse SVON from going through, so the pulse width of pulse SVM is always minimum ON time $TON_{MIN}$, which in this condition becomes the maximum of ON time $TON_{HG}$ that high-side gate signal $S_{HG}$ defines, because of the AND gate in FIG. 2 receiving pulses SVM and SCM.

FIG. 6 also shows soft burst-in time $T_{BI}$ at the beginning of burst time $T_{BST}$ and soft burst-out time $T_{BO}$ at the end of burst time $T_{BST}$. During soft burst-in time $T_{BI}$, current-limiting signal $VCSL_{HG}$ increases stepwise overtime, so both ON time $TON_{HG}$ of high-side switch HS and ON time $TON_{LG}$ of low-side switch LS increase switching cycle by switching cycle. In the opposite, during soft burst-out time $T_{BO}$, current-limiting signal $VCSL_{HG}$ decreases stepwise overtime, so both ON time $TON_{HG}$ of high-side switch HS and ON time $TON_{LG}$ of low-side switch LS decrease switching cycle by switching cycle. The existence of soft burst-in time $T_{BI}$ and soft burst-out time $T_{BO}$ could prevent audible noise which otherwise might happen due to the sudden, considerable change in power conversion.

Please refer to FIGS. 3, 5 and 6. $f_{BST}$ controller 224 in FIG. 5 generates triangular-wave signal VRAMP with hiccup frequency $f_{BST}$, and provides burst-in pulse BI and burst-out pulse BO, performing steps S04 and S06 in FIG. 3, by comparing triangular-wave signal VRAMP with feedback signal $V_{FB2}$.

When feedback signal $V_{FB2}$ exceeds triangular-wave signal VRAMP, hiccup-frequency controller 224 generates burst-in pulse BI, indicating the beginning of soft burst-in time $T_{BI}$ and performing step S12 in FIG. 3 to achieve soft burst-in. In step S12, as soft burst-in time $T_{BI}$ starts, pulse-width-modulation (PWM) is activated, turning ON high-side switch HS and low-side switch LS alternatively. Step S12 also increases current-limiting signal $VCSL_{HG}$ overtime, until current-limiting signal $VCSL_{HG}$ is equal to maximum signal $VCSL_{HGMAX}$. In other words, the maximum signal $VCSL_{HGMAX}$ is about the maximum of current-limiting signal $VCSL_{HG}$, or limits current-limiting signal $VCSL_{HG}$. Step S12 also makes ON time $TON_{HG}$ not more than minimum ON time $TON_{MIN}$. According to embodiments of the invention, after receiving burst-in pulse BI, up/down controller 226 in FIG. 5 makes up/down counter 228 count up using high-side gate signal $S_{HG}$ as a clock, so count CODE increases switching cycle by switching cycle. Digital-to-analog converter 230 converts count CODE into current-limiting signal $VCSL_{HG}$, an analog signal, which accordingly increases overtime. In case that current-limiting signal $VCSL_{HG}$ is found to be not less than maximum signal $VCSL_{HGMAX}$, up/down controller 226 makes up/down counter 228 stop counting, to end soft burst-in time $T_{BI}$, so both count CODE and current-limiting signal $VCSL_{HG}$ stay unchanged after the end of soft burst-in time $T_{BI}$, as shown in FIG. 6. As blocker 227 in FIG. 2 blocks pulse SVON, ON time $TON_{HG}$ that high-side gate signal $S_{HG}$ determines is equal to minimum ON time $TON_{MIN}$ at the most.

When feedback signal $V_{FB2}$ is less than triangular-wave signal VRAMP, hiccup-frequency controller 224 generates burst-out pulse BO, as shown in FIG. 6, indicating the beginning of soft burst-out time $T_{BO}$ and performing step S14 in FIG. 3 to achieve soft burst-out. In step S14, ON time $TON_{HG}$ is still confined to be not more than minimum ON time $TON_{MIN}$, and current-limiting signal $VCSL_{HG}$ is decreased overtime until current-limiting signal $VCSL_{HG}$ is equal to a predetermined minimum. When current-limiting signal $VCSL_{HG}$ is equal to a predetermined minimum, soft burst-out time $T_{BO}$ ends, current-limiting signal $VCSL_{HG}$ stops decreasing, and PWM is deactivated, meaning at least one of high-side switch HS and low-side switch LS stays turned OFF. For example, during soft burst-out time $T_{BO}$, blocker 227 in FIG. 2 blocks pulse SVON, and ON time $TON_{HG}$ accordingly is, at the most, equal to minimum ON time $TON_{MIN}$. After receiving burst-out pulse BO, up/down controller 226 in FIG. 5 makes up/down counter 228 count down using high-side gate signal $S_{HG}$ as a clock, so count CODE and current-limiting signal $VCSL_{HG}$ as well decrease switching cycle by switching cycle. When minimum signal $CODE_{MIN}$ is sent, count CODE has reached a minimum, up/down controller 226 stops up/down counter 228 counting, and PWM is deactivated, turning OFF both high-side switch HS and low-side switch LS, so soft burst-out time $T_{BO}$ ends and pause time $T_{BRK}$ starts. Current-limiting signal $VCSL_{HG}$ is the predetermined minimum when minimum signal $CODE_{MIN}$ is sent.

During the time period after soft burst-in time $T_{BI}$ and before soft burst-out time $T_{BO}$, PWM is activated, and ON time $TON_{HG}$, not more than minimum ON time $TON_{MIN}$, is a constant, generally determined by current-limiting signal $VCSL_{HG}$, which stays as a constant during this time period. During pause time $T_{BRK}$, which follows the end of soft burst-out time $T_{BO}$ and ends when next soft burst-in time $T_{BI}$ starts, PWM is deactivated and both high-side switch HS and low-side switch LS are turned OFF as shown in FIG. 6. An embodiment of the invention may have only one of high-side switch HS and low-side switch LS constantly turned OFF during pause time $T_{BRK}$.

Figure 7:
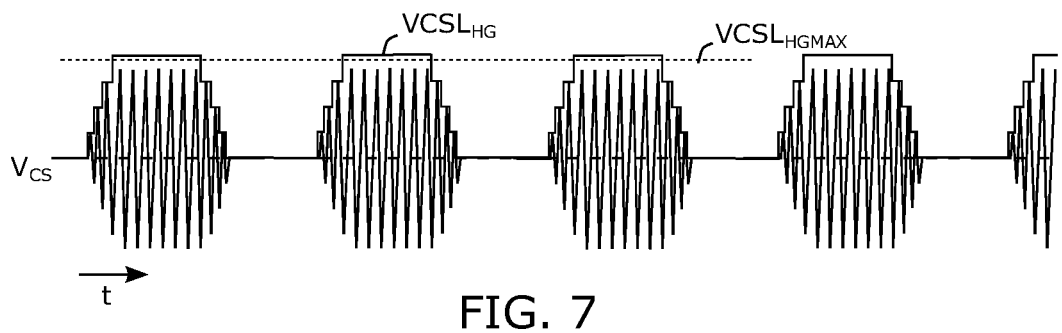
FIG. 7 demonstrates that during burst time $T_{BST}$ current-sense signal $V_{CS}$ sometimes starts decreasing before it reaches current-limiting signal $VCSL_{HG}$.

FIG. 6 demonstrates that peaks of current-sense signal $V_{CS}$ always reach current-limiting signal $VCSL_{HG}$, indicating that ON time $TON_{HG}$ of high-side gate signal $S_{HG}$ is basically defined by current-mode controller 214, but this invention is not limited to. FIG. 7 demonstrates that during burst time $T_{BST}$ current-sense signal $V_{CS}$ sometimes decreases before it reaches current-limiting signal $VCSL_{HG}$. As aforementioned before, in the power-saving mode, ON time $TON_{HG}$ is limited to be not more than minimum ON time $TON_{MIN}$. It is possible that at the time near the end of soft burst-in time $T_{BI}$ current-mode ON time $TON_{CM}$ defined by current-mode controller 214 has exceeded minimum ON time $TON_{MIN}$, so ON time $TON_{HG}$ equals to minimum ON time $TON_{MIN}$. In other words, current-sense signal $V_{CS}$ might not raise to reach current-limiting signal $VCSL_{HG}$, as shown in FIG. 7. For example, input voltage $V_{IN}$ for waveforms in FIG. 6 is 237V, and that for waveforms in FIG. 7 is 110V. The higher input voltage $V_{IN}$, the more possibility that current-sense signal $V_{CS}$ reaches current-limiting signal $VCSL_{HG}$ during minimum ON time $TON_{MIN}$.

Step S08 in FIG. 3 checks whether to exit the power-saving mode. For instance, LLC controller 102 in FIG. 2 determines it is time to exit the power-saving mode and to perform step S16 if burst signal $V_{BST}$ is less than 1V and both feedback signals $V_{FB1}$ and $V_{FB2}$ are more than 1V. Otherwise, steps S04 and S06 follow.

Figure 8:
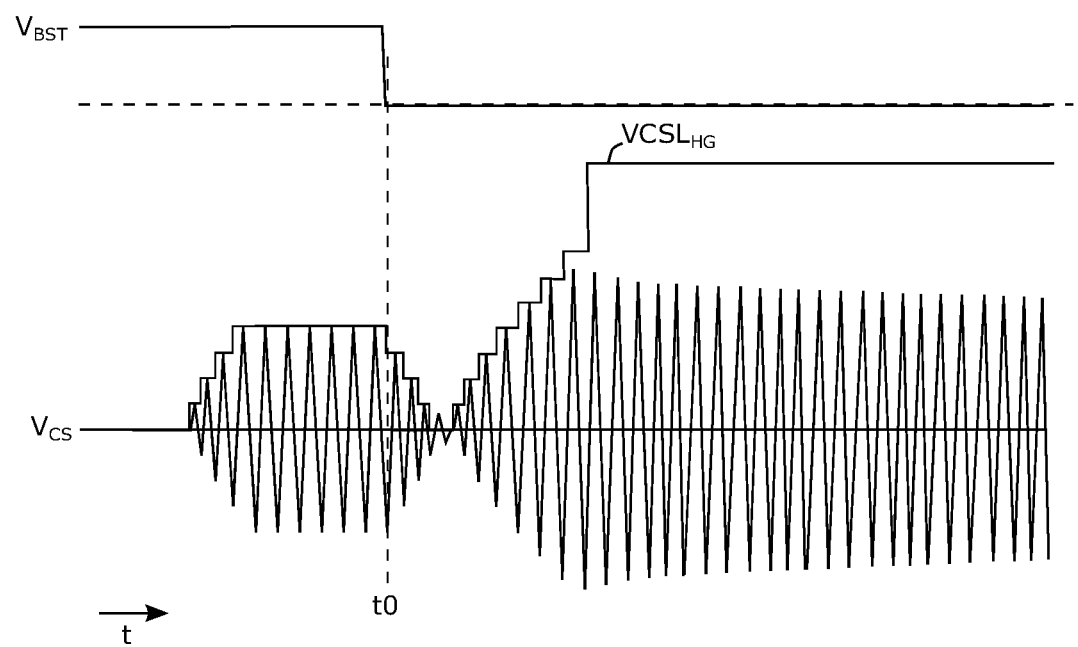
FIG. 8 shows that current-limiting signal $VCSL_{HG}$ decreases stepwise first, and then turns to increase stepwise when it drops to about 0V.

Step S16 is a transitional step for the operation changing from the power-saving mode to the non-power-saving mode. Step S16 first activates PWM, allowing high-side switch HS and low-side switch LS to turn ON alternatively. According to an embodiment of the invention, to perform step S16, up/down controller 226 demands up/down counter 228 to count down first and, when count CODE reaches its minimum, to count up. Up/down counter 228 stops counting if count CODE reaches its maximum. As shown in FIG. 8, burst signal $V_{BST}$ is about 0V at moment t0, so step S16 in FIG. 3 starts to exit the power-saving mode. FIG. 8 shows that current-limiting signal $VCSL_{HG}$ decreases stepwise first, and then turns to increase stepwise when it drops to about 0V, a minimum of current-limiting signal $VCSL_{HG}$. Current-limiting signal $VCSL_{HG}$ increases and then remains at its highest corresponding to the maximum of count CODE. In FIG. 8, after moment t0, the peaks of current-sense signal $V_{CS}$ follows current-limiting signal $VCSL_{HG}$ briefly, but do not soon after because ON time $TON_{HG}$ is quickly limited by voltage-mode controller 212, which determines ON time $TON_{HG}$ based on feedback signal $V_{FB2}$ and saw-wave signal $VSAW_{HB}$.

The above disclosed embodiments have up/down counter 228 to increase or decrease current-limiting signal $VCSL_{HG}$, but the invention is not limited to. In one embodiment, limiting-signal generator 222 might be embodied by current sources to charge or discharge a capacitor, and the capacitor voltage across the capacitor is used as current-limiting signal $VCSL_{HG}$. For example, during soft burst-in time $T_{BI}$, current-limiting signal $VCSL_{HG}$, the capacitor voltage in this embodiment, increases linearly as a current source constantly charging the capacitor. During soft bout-out time $T_{BO}$, current-limiting signal $VCSL_{HG}$ decreases linearly as another current source constantly discharging the capacitor.

Soft burst-in and burst-out can prevent audible noise that happens otherwise due to the sudden activation or deactivation of power conversion. Furthermore, constant hiccup frequency f -BST better stabilizes the operation power that LLC controller 102 requires.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method in use of a power converter comprising a power switch and an inductive device, wherein the power switch controls an inductor current through the inductive device, the control method comprising:
    providing a current-sense signal representing the inductor current;
    determining an ON time of the power switch in response to a feedback signal and a saw-wave signal, to operate the power converter in a non-power-saving mode, wherein the feedback signal is generated according to an output voltage of the power converter; and
    operating the power converter in a power-saving mode to perform first steps comprising:
        activating pulse-width-modulation for a burst time, wherein the burst time comprises a soft burst-in time and a soft burst-out time;
        deactivating the pulse-width-modulation for a pause time;
        comparing the current-sense signal and a current-limiting signal to determine the ON time;
        increasing the current-limiting signal during the soft burst-in time; and
        decreasing the current-limiting signal during the soft burst-out time.

2. The control method as claimed in claim 1, further comprising:
    making the ON time not less than a minimum ON time when operating in the non-power-saving mode; and
    making the ON time not more than the minimum ON time when operating in the power-saving mode.

3. The control method as claimed in claim 1, wherein a summation of the burst time and the pause time is a predetermined period.

4. The control method as claimed in claim 1, comprising:
stepwise increasing the current-limiting signal during the soft burst-in time.

5. The control method as claimed in claim 1, comprising:
stepwise decreasing the current-limiting signal during the soft burst-out time.

6. The control method as claimed in claim 1, comprising:
checking whether to exit the power-saving mode, to perform second steps comprising:
activating the pulse-width-modulation; and
increasing the current-limiting signal until the current-limiting signal reaches a maximum value.

7. The control method as claimed in claim 6, wherein the second steps further comprise:
decreasing the current-limiting signal before increasing the current-limiting signal.

8. The control method as claimed in claim 6, wherein the maximum value corresponds to a count generated from a counter.

9. The control method as claimed in claim 1, comprising:
providing a maximum signal to limit the current-limiting signal when operating the power converter in the power-saving mode.

10. A power controller in use of a power converter comprising an inductive device and a power switch, wherein the power switch controls an inductor current through the inductive device, the power controller comprising:
a voltage-mode controller determining an ON time of the power switch in response to a feedback signal and a saw-wave signal, wherein the feedback signal is generated according to an output voltage of the power converter; and
a current-mode controller determining the ON time of the power switch in response to a current-sense signal and a current-limiting signal, and determining a soft burst-in time and a soft burst-out time in response to the feedback signal, wherein during the soft burst-in time the current-limiting signal increases, during the soft burst-out time the current-limiting signal decreases, and the current-sense signal represents the inductor current,
wherein the current-mode controller starts the soft burst-in time and the soft burst-out time in response to the feedback signal and a triangular-wave signal.

11. The power controller as claimed in claim 10, wherein the soft burst-in time ends when the current-limiting signal increases to exceed a maximum signal.

12. The power controller as claimed in claim 10, wherein the current-mode controller comprises:
a hiccup-frequency controller for comparing the feedback signal and the triangular-wave signal to generate a burst-in pulse and a burst-out pulse;
an up/down counter using a gate signal as a clock to provide a count, wherein the gate signal controls the power switch;
a digital-to-analog converter for converting the count into the current-limiting signal; and
an up/down controller controlling the up/down counter in response to the burst-in pulse and the burst-out pulse.

13. The power controller as claimed in claim 12, wherein the hiccup-frequency controller provides the burst-in pulse when the feedback signal exceeds the triangular-wave signal, and provides the burst-out pulse when the feedback signal is less than the triangular-wave signal.

14. The power controller as claimed in claim 12, wherein the up/down controller stops the up/down counter counting if the current-limiting signal is not less than a maximum signal.

15. The power controller as claimed in claim 10, wherein the voltage-mode controller makes the ON time not less than a minimum ON time, and the ON time is not more than the minimum ON time when the power controller operates the power converter in a power-saving mode according to the feedback signal.

16. The power controller as claimed in claim 15, wherein the power controller determines to exit the power-saving mode according to the feedback signal, and the current-limiting signal increases when exiting the power-saving mode.

17. The power controller as claimed in claim 10, wherein the power converter has a primary side and a secondary side, the power controller is used in the primary side, and the power controller determines to operate the power converter in a power-saving mode in response to a power saving signal in the secondary side.

18. The power controller as claimed in claim 17, wherein a burst signal in the primary side is generated in response to the power saving signal, the power controller provides a maximum signal corresponding to the burst signal, and the maximum signal limits the current-limiting signal.

* * * * *